US012794998B2

(12) United States Patent
Laitila et al.

(10) Patent No.: US 12,794,998 B2
(45) Date of Patent: Nov. 10, 2026

(54) APPARATUS, METHOD AND COMPUTER PROGRAM

(71) Applicant: Nokia Technologies Oy, Espoo (FI)

(72) Inventors: Matti Einari Laitila, Oulu (FI); Markus Sakari Isomäki, Espoo (FI); Gayathri Tadas, Bangalore (IN); Devaki Chandramouli, Dallas, TX (US); Rakash Sivasiva Ganesan, Munich (DE); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 57 days.

(21) Appl. No.: 18/862,005

(22) PCT Filed: May 5, 2023

(86) PCT No.: PCT/EP2023/061957
§ 371 (c)(1),
(2) Date: Oct. 31, 2024

(87) PCT Pub. No.: WO2023/214022
PCT Pub. Date: Nov. 9, 2023

(65) Prior Publication Data

US 2025/0175537 A1 May 29, 2025

(30) Foreign Application Priority Data

May 5, 2022 (IN) ............................ 202241026201

(51) Int. Cl.
*H04L 67/62* (2022.01)
*H04L 67/14* (2022.01)

(52) U.S. Cl.
CPC .............. *H04L 67/62* (2022.05); *H04L 67/14* (2013.01)

(58) Field of Classification Search
CPC ......... H04L 67/62; H04L 67/14; H04L 47/28; H04L 5/0023; H04L 5/0048; H04L 5/0055; H04L 5/0062; H04L 5/0053; H04W 28/0268
See application file for complete search history.

(56) References Cited

U.S. PATENT DOCUMENTS

2018/0132269 A1* 5/2018 Wang .................... H04L 5/0051
2020/0120705 A1* 4/2020 Wang .................... H04L 5/0082
2020/0280940 A1* 9/2020 Kim ..................... H04J 11/0086
2020/0404604 A1* 12/2020 Hande ................. H04W 56/004
2022/0046567 A1 2/2022 Kahn et al.

(Continued)

OTHER PUBLICATIONS

"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.

(Continued)

*Primary Examiner* — Richard G Keehn
(74) *Attorney, Agent, or Firm* — Lippes Mathias LLP

(57) ABSTRACT

There is provided an apparatus, said apparatus comprising means for at an entity, determining burst timing information for at least one uplink periodic traffic stream of an application at an uplink ingress node, determining feedback information based on the burst timing information and radio access network, RAN, information and providing the feedback information to a function associated with the application.

20 Claims, 8 Drawing Sheets

(56) References Cited

U.S. PATENT DOCUMENTS

| | | | | |
|---|---|---|---|---|
| 2022/0330183 | A1* | 10/2022 | Minokuchi | H04J 3/12 |
| 2022/0338142 | A1* | 10/2022 | Minokuchi | H04W 56/001 |
| 2023/0053602 | A1* | 2/2023 | Bonneville | H04W 28/24 |
| 2023/0319631 | A1 | 10/2023 | Laitila et al. | |
| 2024/0373283 | A1* | 11/2024 | Zou | H04W 80/02 |
| 2025/0008370 | A1* | 1/2025 | Sun | H04W 72/543 |

OTHER PUBLICATIONS

"3rd Generation Partnership Project; Technical Specification Group Services and System Aspects; Procedures for the 5G System (5GS); Stage 2 (Release 17)", 3GPP TS 23.502, V17.4.0, Mar. 2022, pp. 1-738.

"3rd Generation Partnership Project; Technical Specification Group Services and System Aspects; Study on timing resiliency and TSC and URLLC enhancements (Release 18)", 3GPP TR 23.700-25, V0.2.0, Apr. 2022, pp. 1-56.

"Burst arrival time adaptation", 3GPP TSG-SA WG2#149E e-meeting, S2-2201179, Agenda: 9.7, Qualcomm Incorporated, Feb. 14-25, 2022, pp. 1-2.

"Solution2 Update for UL scheduling", 3GPP TSG-WG SA2 Meeting #150E e-meeting, S2-2202529, Agenda: 9.7, Huawei, Apr. 6-12, 2022, pp. 1-3.

International Search Report and Written Opinion received for corresponding Patent Cooperation Treaty Application No. PCT/EP2023/061957, dated Jun. 26, 2023, 11 pages.

* cited by examiner

APPARATUS, METHOD AND COMPUTER PROGRAM

RELATED APPLICATION

This application claims priority to PCT Patent Application No. PCT/EP2023/061957, filed 5 May 2023, which claims priority from India Application No. 202241026201, filed on 5 May 2022, which is incorporated herein by reference in its entirety.

FIELD

The present application relates to a method, apparatus, system and computer program and in particular but not exclusively to burst arrival time determination for UL streams.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for, at an entity, determining burst timing information for at least one uplink periodic traffic stream of an application at an uplink ingress node, determining feedback information based on the burst timing information and radio access network, RAN, information and providing the feedback information to a function associated with the application.

The entity may comprise a RAN node. Means for determining the burst timing information may comprise means for receiving the burst timing information from the uplink ingress node via a time sensitive communication time synchronisation function.

The apparatus may comprise means for receiving the burst timing information in time sensitive communication assistance information from a session management function.

The uplink ingress node may be configured to observe the burst timing information by an indication from the time sensitive communication time synchronisation function.

The entity may comprise a time sensitive communication time synchronisation function. The means for determining the burst timing information may comprise means for receiving the burst timing information from the uplink ingress node.

The apparatus may comprise means for receiving the burst timing information using a port management information container.

The apparatus may comprise means for providing an indication to the uplink ingress node to observe the burst timing information.

The apparatus may comprise means for receiving the RAN information at the entity from a RAN node.

The entity may comprise the uplink ingress node. The means for determining the burst timing information may comprise means for observing the burst timing information.

The apparatus may comprise means for providing the feedback information to the function associated with the application using a port management information container.

The apparatus may comprise means for providing the feedback information to the function associated with the application via an access and mobility management function.

The apparatus may comprise means for providing the feedback information to the access and mobility management function using non-access stratum session management signalling.

The apparatus may comprise means for receiving an indication at the entity to observe the burst timing information and determine feedback information based on the observed burst timing information.

A port management information container may comprise the indication.

The indication may comprise at least one of an indication of the uplink periodic traffic stream and a measurement configuration.

The burst timing information may comprise at least one of burst periodicity, absolute burst arrival time, burst arrival time variation and offset time to a configured scheduling grant.

The RAN information may comprise at least one of RAN configuration and RAN node burst arrival time preferences.

The uplink ingress node may comprise a user equipment or a device side time sensitive network translator.

The feedback information may comprise preferred uplink burst timing information.

In a second aspect, there is provided a method comprising, at an entity, determining burst timing information for at least one uplink periodic traffic stream of an application at an uplink ingress node, determining feedback information based on the burst timing information and radio access network, RAN, information and providing the feedback information to a function associated with the application.

The entity may comprise a RAN node. Determining the burst timing information may comprise receiving the burst timing information from the uplink ingress node via a time sensitive communication time synchronisation function.

The method may comprise receiving the burst timing information in time sensitive communication assistance information from a session management function.

The uplink ingress node may be configured to observe the burst timing information by an indication from the time sensitive communication time synchronisation function.

The entity may comprise a time sensitive communication time synchronisation function. Determining the burst timing information may comprise receiving the burst timing information from the uplink ingress node.

The method may comprise receiving the burst timing information using a port management information container.

The method may comprise providing an indication to the uplink ingress node to observe the burst timing information.

The method may comprise receiving the RAN information at the entity from a RAN node.

The entity may comprise the uplink ingress node. Determining the burst timing information may comprise observing the burst timing information.

The method may comprise providing the feedback information to the function associated with the application using a port management information container.

The method may comprise providing the feedback information to the function associated with the application via an access and mobility management function.

The method may comprise providing the feedback information to the access and mobility management function using non-access stratum session management signalling.

The method may comprise receiving an indication at the entity to observe the burst timing information and determine feedback information based on the observed burst timing information.

A port management information container may comprise the indication.

The indication may comprise at least one of an indication of the uplink periodic traffic stream and a measurement configuration.

The burst timing information may comprise at least one of burst periodicity, absolute burst arrival time, burst arrival time variation and offset time to a configured scheduling grant.

The RAN information may comprise at least one of RAN configuration and RAN node burst arrival time preferences.

The uplink ingress node may comprise a user equipment or a device side time sensitive network translator.

The feedback information may comprise preferred uplink burst timing information.

In a third aspect there is provided an apparatus comprising at least one processor and at least one memory including a computer program code, the at least one memory and computer program code configured to, with the at least one processor, cause the apparatus at least to, at an entity determine burst timing information for at least one uplink periodic traffic stream of an application at an uplink ingress node, determine feedback information based on the burst timing information and radio access network, RAN, information and provide the feedback information to a function associated with the application.

The entity may comprise a RAN node. The apparatus may be configured to receive the burst timing information from the uplink ingress node via a time sensitive communication time synchronisation function.

The apparatus may be configured to receive the burst timing information in time sensitive communication assistance information from a session management function.

The uplink ingress node may be configured to observe the burst timing information by an indication from the time sensitive communication time synchronisation function.

The apparatus may be configured to receive the burst timing information from the uplink ingress node.

The apparatus may be configured to receive the burst timing information using a port management information container.

The apparatus may be configured to provide an indication to the uplink ingress node to observe the burst timing information.

The apparatus may be configured to receive the RAN information at the entity from a RAN node.

The entity may comprise the uplink ingress node. The apparatus many be configured to observe the burst timing information.

The apparatus may be configured to provide the feedback information to the function associated with the application using a port management information container.

The apparatus may be configured to provide the feedback information to the function associated with the application via an access and mobility management function.

The apparatus may be configured to provide the feedback information to the access and mobility management function using non-access stratum session management signalling.

The apparatus may be configured to receive an indication at the entity to observe the burst timing information and determine feedback information based on the observed burst timing information.

A port management information container may comprise the indication.

The indication may comprise at least one of an indication of the uplink periodic traffic stream and a measurement configuration.

The burst timing information may comprise at least one of burst periodicity, absolute burst arrival time, burst arrival time variation and offset time to a configured scheduling grant.

The RAN information may comprise at least one of RAN configuration and RAN node burst arrival time preferences.

The uplink ingress node may comprise a user equipment or a device side time sensitive network translator.

The feedback information may comprise preferred uplink burst timing information.

In a fourth aspect there is provided a computer readable medium comprising program instructions for causing an apparatus to perform at least the following, at an entity, determining burst timing information for at least one uplink periodic traffic stream of an application at an uplink ingress node, determining feedback information based on the burst timing information and radio access network, RAN, information and providing the feedback information to a function associated with the application.

The entity may comprise a RAN node. Determining the burst timing information may comprise receiving the burst timing information from the uplink ingress node via a time sensitive communication time synchronisation function.

The apparatus may be caused to perform receiving the burst timing information in time sensitive communication assistance information from a session management function.

The uplink ingress node may be configured to observe the burst timing information by an indication from the time sensitive communication time synchronisation function.

The entity may comprise a time sensitive communication time synchronisation function.

Determining the burst timing information may comprise receiving the burst timing information from the uplink ingress node.

The apparatus may be caused to perform receiving the burst timing information using a port management information container.

The apparatus may be caused to perform providing an indication to the uplink ingress node to observe the burst timing information.

The apparatus may be caused to perform receiving the RAN information at the entity from a RAN node.

The entity may comprise the uplink ingress node. Determining the burst timing information may comprise observing the burst timing information.

The apparatus may be caused to perform providing the feedback information to the function associated with the application using a port management information container.

The apparatus may be caused to perform providing the feedback information to the function associated with the application via an access and mobility management function.

The apparatus may be caused to perform providing the feedback information to the access and mobility management function using non-access stratum session management signalling.

The apparatus may be caused to perform receiving an indication at the entity to observe the burst timing information and determine feedback information based on the observed burst timing information.

A port management information container may comprise the indication.

The indication may comprise at least one of an indication of the uplink periodic traffic stream and a measurement configuration.

The burst timing information may comprise at least one of burst periodicity, absolute burst arrival time, burst arrival time variation and offset time to a configured scheduling grant.

The RAN information may comprise at least one of RAN configuration and RAN node burst arrival time preferences.

The uplink ingress node may comprise a user equipment or a device side time sensitive network translator.

The feedback information may comprise preferred uplink burst timing information.

In a fifth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for example QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

5G networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
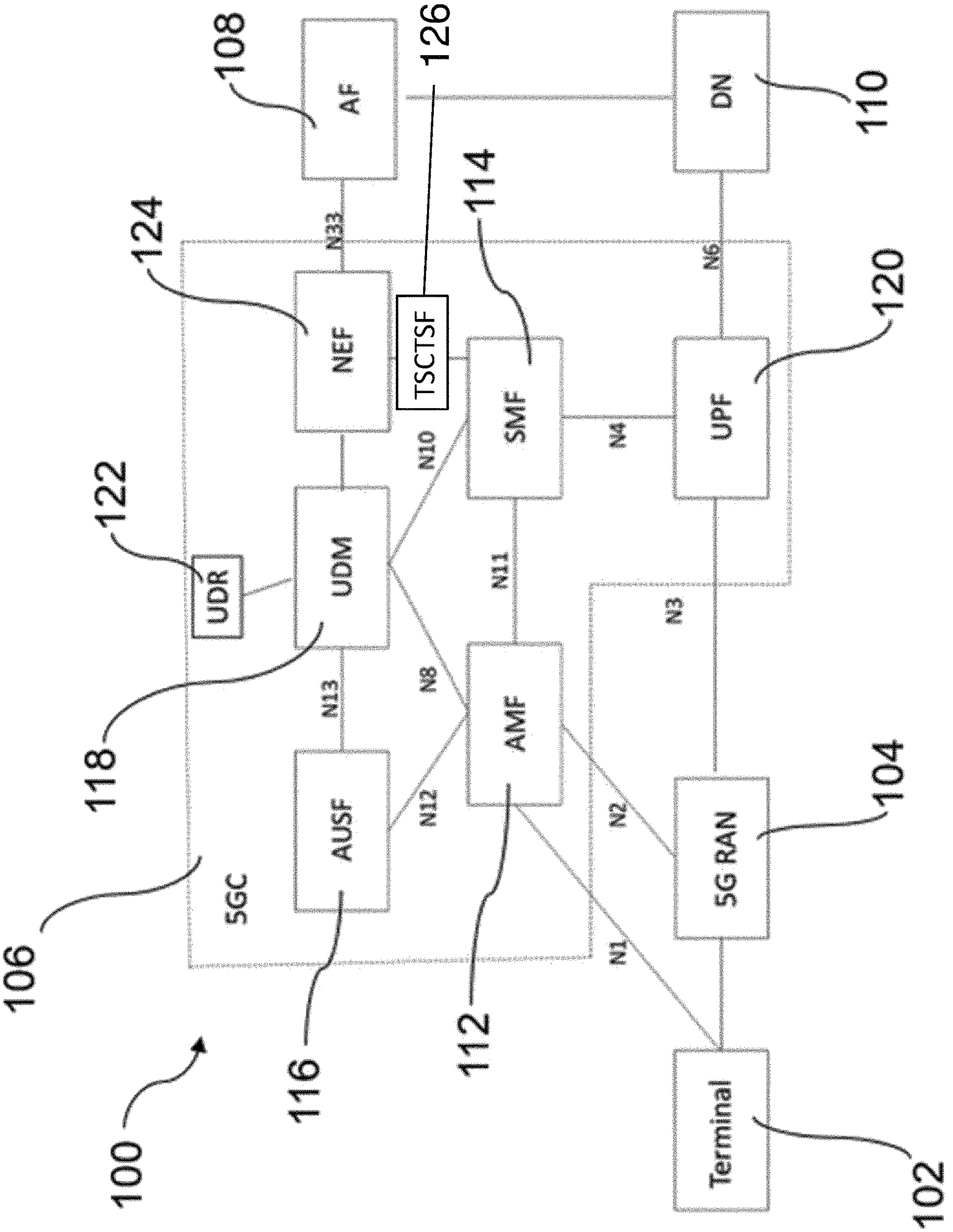
FIG. 1 shows a schematic diagram of an example 5GS communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function). A Time Sensitive Communication Time Synchronisation Function (TSCTSF) 126 forwards a Time Sensitive Communication Assistance Container (TSCAC) to the SMF via (PCF).

The CN is connected to a terminal device via the radio access network (RAN). The 5GRAN may comprise one or more gNodeB (GNB) distributed unit functions connected to one or more gNodeB (GNB) centralized unit functions. The RAN may comprise one or more access nodes.

A UPF (User Plane Function) whose role is called PSA (Protocol Data Unit (PDU) Session Anchor) may be responsible for forwarding frames back and forth between the DN (data network) and the tunnels established over the 5G towards the UE(s) exchanging traffic with the DN.

Figure 2:
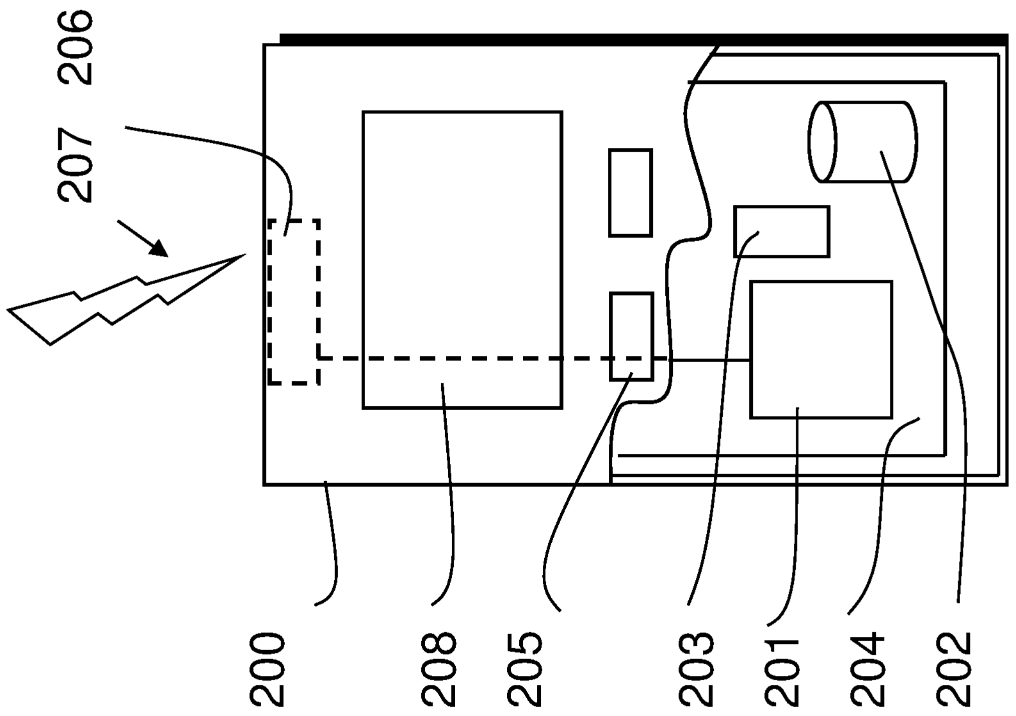
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
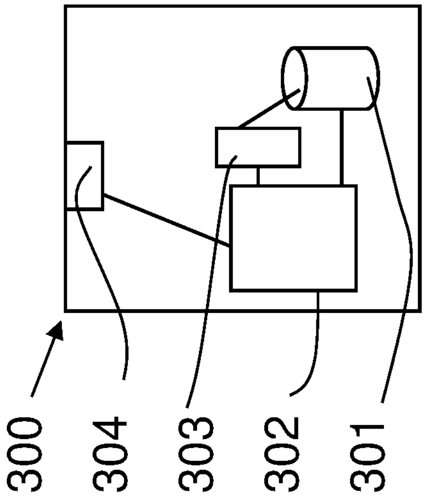
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

A need for applications to adapt downstream scheduling in order for 5GS to meet very low latency requirements (e.g. to meet a Packet Delay Budget (PDB) of 2 msecs), in particular, a need for application transmission schedule adaptation and the ability to meet very low PDB for a QoS Flow from the 5GS perspective for periodic traffic streams (based on feedback from RAN WGs) is being considered.

Further, a need to have feedback from RAN (e.g. for an application to consider DL packet transmission time slots to avoid buffering in the RAN) is being considered. That is, how to enable the RAN to provide feedback to an application for low latency communication (e.g. for an application to consider DL packet transmission time slots to avoid buffering in the RAN) is being considered.

Although the focus is on downstream scheduling, any changes to upstream scheduling should not be precluded if similar enhancement as for downstream scheduling may be applied.

There are two approaches for providing the burst timing feedback from Next Generation Radio Access Network (NG-RAN) to applications, reactive and pro-active.

In the reactive approach, after a Time Sensitive Communication (TSC) application starts transmitting streams, feedback is provided to the application by a RAN node based on observed ingress burst arrival times at the RAN node.

In the pro-active approach, feedback (e.g., transmission schedule preferences) is provided to applications before the transmission starts in order for applications to take advantage of the provided information in transmission timing determination.

A proposal based on a reactive feedback mechanism has been proposed. In this proposal, a RAN node observes Burst Arrival Times (BATs) of received downlink (DL) packets and provides feedback to an application function via SMF.

Upon reception of DL packets from the UPF via the user plane for a Quality of Service (QOS) Flow, if NG-RAN has received an indication of support of Burst arrival time adaptation in Time Sensitive Communication Assistance Information (TSCAI) for the given QoS Flow and NG-RAN determines the need to adapt the burst arrival time, NG-RAN sends an indication to SMF including a burst arrival time offset value. The burst arrival offset can take positive or negative values.

The reactive method is also being considered as a component of the complete RAN feedback. In a further proposal, a RAN node derives feedback both for uplink (UL) and DL nodes when pro-active feedback is given. RAN node also derives reactive feedback for DL nodes.

For reactive feedback, the entity providing the feedback for the applications should be aware of the current radio configuration (Time Division Duplex (TDD) configuration) and the actual burst arrival times at the radio interface in reference to the physical layer resource configuration (scheduling).

One entity for the feedback derivation is the RAN node (base station), which is responsible for radio configuration and is also an ingress node to the radio interface for DL application streams, enabling the RAN node directly to observe arrival times of the DL bursts. For this reason, it's the RAN node, which derives the RAN feedback in the proposal described above.

The proposal described above provides a solution where the RAN node (e.g., a central unit control plane (CU-CP) of a gNB) derives feedback based on the observed burst arrival times, but it does not describe how the arrival times of bursts are detected, and the solution focuses on DL streams.

One issue is how to derive RAN feedback for a periodic UL stream in the RAN node (or more generally on a network side) that is not an ingress node to the radio interface for UL application streams. Only a UE, as an ingress node to radio interface for UL packets, can observe UL BATs, but the RAN node derives UL stream feedback for applications.

In one proposal, a UE determines a relative burst arrival time offset value in reference to Burst Arrival Time (BAT) experienced by the UE and scheduling UL time slot at the UE and sends the time offset to RAN via Radio Resource Control (RRC) message.

This proposal impacts the RRC protocol. Proposals for assistance information (containing UL packet arrival times) signalling over RRC from UE to RAN for aiding scheduling configuration have been rejected for standardisation.

A solution for providing pro-active and re-active RAN feedback from RAN node to applications for DL flows has been provided but does not consider how the RAN feedback is derived by the RAN node (or central node) for UL flows.

Figure 4:
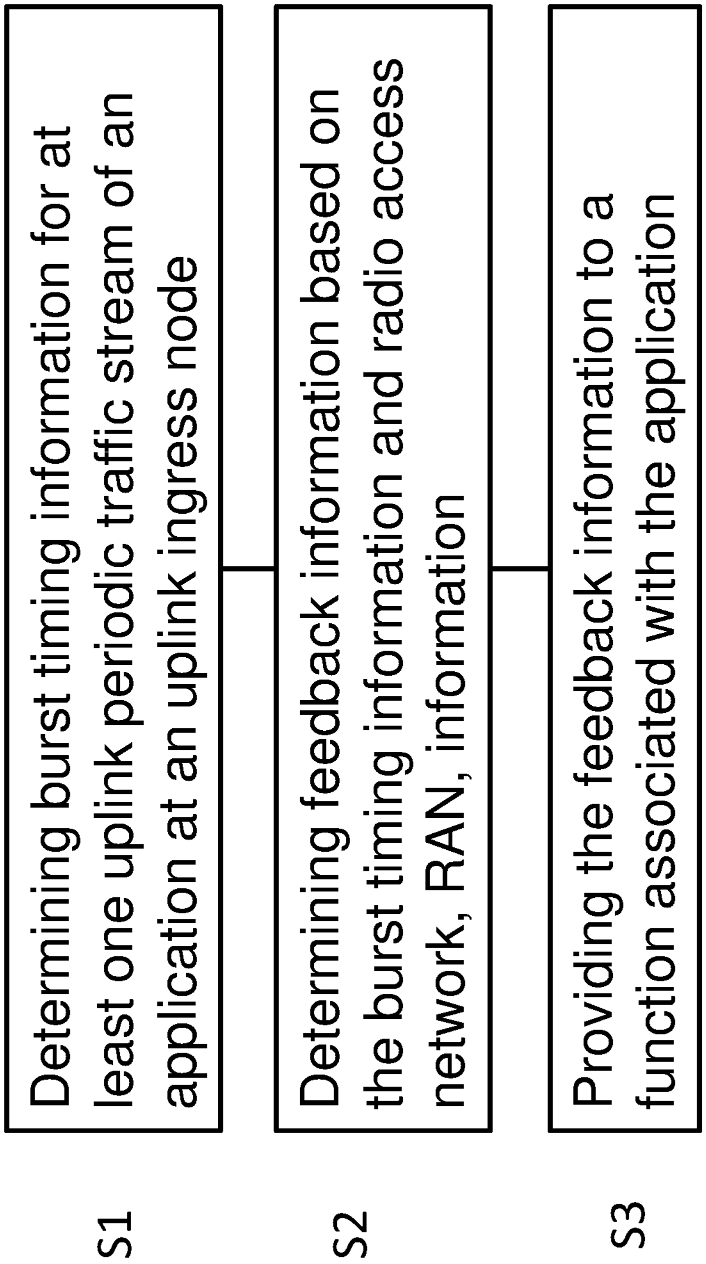
FIG. 4 shows a flowchart of a method according to an example embodiment.

FIG. 4 shows a flowchart of a method according to an example embodiment. The method is performed at an entity. The entity may comprise a RAN node (e.g., a gNB), a core network node (e.g., a Time Sensitive Communication Time Synchronization Function (TSCTSF)), or an uplink ingress node (e.g., a UE or a Device Side Time Sensitive Network Translator DS-TT).

In S1, the method comprises determining burst timing information for at least one uplink periodic traffic stream of an application at an uplink ingress node.

In S2, the method comprises determining feedback information based on the burst timing information and radio access network, RAN, information.

In S3, the method comprises providing the feedback information to a function associated with the application.

The burst timing information may comprise at least one of burst periodicity, absolute burst arrival time, burst arrival time variation and offset time to a configured scheduling grant.

The RAN information may comprise at least one of RAN configuration and RAN node burst arrival time preferences.

The uplink ingress node may be a user equipment (UE) or a device side time sensitive network translator (DS-TT).

The feedback information may comprise preferred UL burst timing information.

The uplink ingress node may be a UE or a DS-TT.

The UL periodic traffic stream may be a QoS flow.

When the entity is a RAN node, determining the burst timing information comprises receiving the burst timing information from the uplink ingress node via a TSCTSF. The method may comprise receiving the burst timing information in time sensitive communication assistance information from a session management function.

The TSCTSF may provide an indication to the uplink ingress node to observe the timing information. The indication may be provided in a PMIC. The indication may comprise at least one of an indication of the uplink periodic traffic stream (e.g., a packet filter to identify the UL traffic stream) and a measurement configuration (e.g., the measurement type (absolute BAT, offset), measurement period and reporting interval).

In a first example embodiment, a Device Side TSN Translator (DS-TT) observes burst arrival times of UL streams. Alternatively, or in addition the UE observes burst arrival times and communicates results to the DS-TT. Burst timing information based on the burst arrival times is then communicated through TSCTSF to the RAN node. In this example embodiment the DS-TT indicates UL burst arrival time information (ingress of DS-TT) in the Port Management Information Container (PMIC) delivery to TSCTSF from the DS-TT.

The TSCTSF considers UE-DS-TT residence time and calculates the expected UL burst arrival time info to the SMF inside a TSC Assistance Container (TSCAC).

From the SMF the timing info is delivered to the RAN node as a part of TSC Assistance Information (TSCAI).

Once the RAN node receives the burst timing information, it derives feedback based on the UL burst timing information and RAN configuration and forwards the feedback to the application function.

Figure 5:
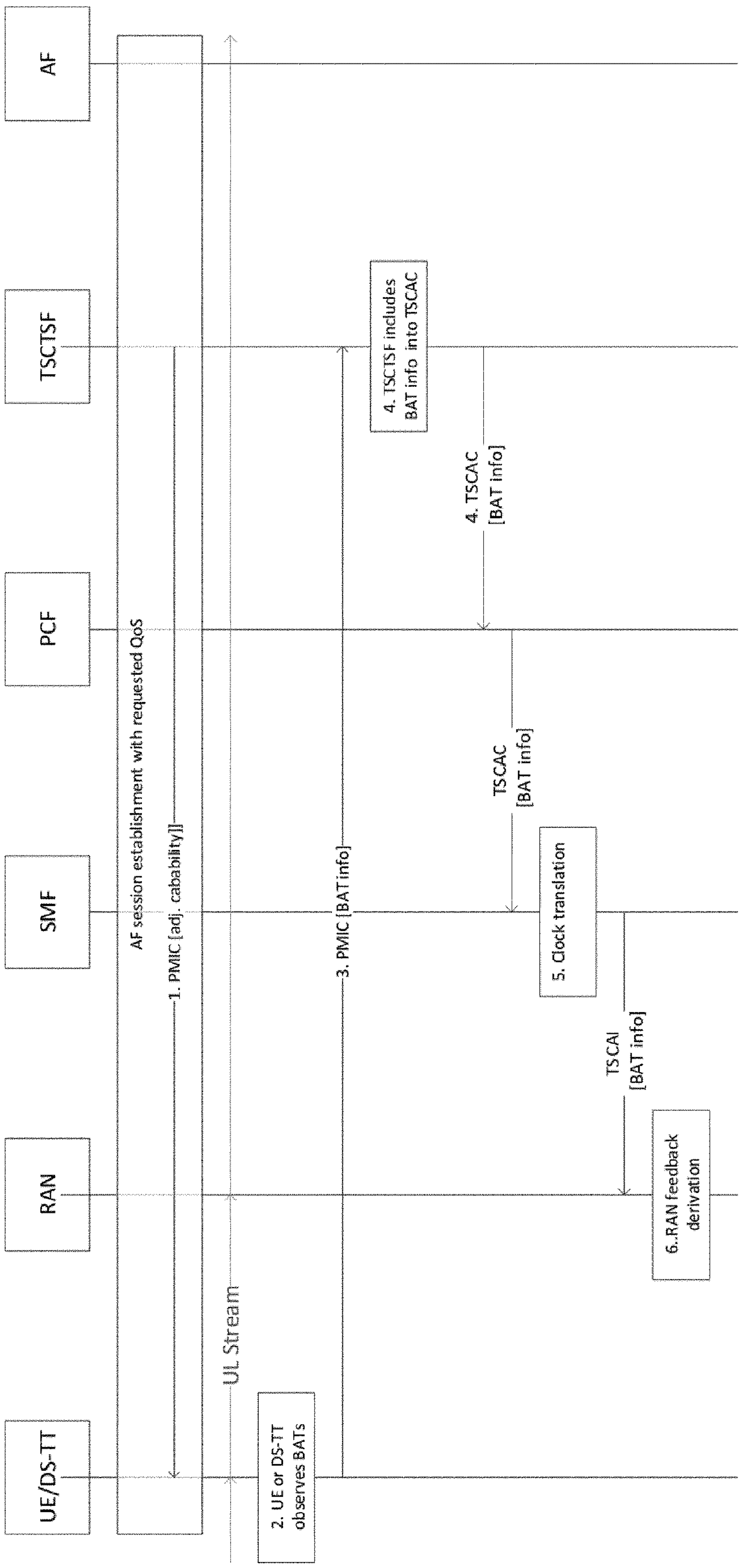
FIG. 5 shows a signalling flow according to an example embodiment.

FIG. 5 shows a signalling flow diagram according to the first example embodiment. In the example scenarios shown in FIGS. 5 to 8, a TSC application function requests an AF session with requested QoS. The application function indicates in the request its capability to mid-stream (reactive) adjustment of burst transmission time. The 5G session with requested QoS is set up and the application sender starts to send bursts of the periodic UL stream.

In step 1 of FIG. 5, after receiving the adjustment capability information from the AF the TSCTSF sends an indication to DS-TT in a PMIC to start UL BAT measurements and BAT information reporting to the TSCTSF. This indication includes a packet filter to identify the UL traffic flow for which the BAT measurement and reporting is to be done. The filter type depends on the PDU session type.

If the UE performs UL BAT measurements, the DS-TT forwards the BAT measurement indication and the packet filter to the UE. The UE compares the packet filter to the filters it has in its QoS rules for mapping UL packets to QoS flows. In case there is a direct match, the UE is able to do the BAT measurements on the level of a specific QoS flow. The measurement indication may include the measurement type (absolute BAT, offset), measurement period and reporting interval.

Alternatively, burst timing adjustment capability of the application sender may be indicated to RAN, and RAN communicates the capability to the UE in RRC signalling. In this case QFI can be used as a reference for which QoS flow the BAT measurements and reporting are to be done.

In step 2, the UE observes arrival times of the UL bursts of the periodic stream and communicates UL burst timing information to the DS-TT.

Alternatively, the DS-TT observes UL BATs, applying the packet filter it received from the TSCTSF.

In step 3, the DS-TT includes the UL burst timing information into Port Management Information Container (PMIC) and sends PMIC to the TSCTSF as specified in 3GPP standards.

In step 4, the TSCTSF receives UL burst timing info in PMIC from the DS-TT, includes the UL burst timing info in the TSCAC and sends TSCAC to the SMF through the PCF.

In step 5, if the UL burst arrival times was observed by the DS-TT, the SMF calculates the burst arrival time at the radio by taking UE residence time into account. SMF includes burst timing info into the TSCAI and sends the TSCAI to the RAN node with a PDU session modification signaling.

In step 6, the RAN node derives the feedback for UL by taking UL burst arrival info and the RAN configuration into account. The RAN feedback is communicated to AF.

When the entity comprises a core network node, e.g., TSCTSF, determining the burst timing information may comprise receiving the burst timing information from the uplink ingress node. The burst timing information may be received in a port management information container (PMIC). The method may comprise receiving the RAN information at the entity from a RAN node. The method may comprise providing an indication to the uplink ingress node to observe the burst timing information as described above.

In a second example embodiment the DS-TT observes burst arrival times of UL streams (alternatively, the UE observes burst arrival times and communicates results to the DS-TT) and burst arrival time information is communicated to the TSCTSF from the DS-TT. In this example, PMIC delivery is utilized in UL burst arrival time info transmission to the TSCTSF from the DS-TT.

The TSCTSF derives the UL Burst Arrival Time taking RAN configuration or RAN's burst arrival time preferences into account.

For TSCTSF to derive UL Burst Arrival Time, the radio configuration of the RAN node or RAN node's UL burst arrival time preferences are communicated to TSCTSF.

Figure 6:
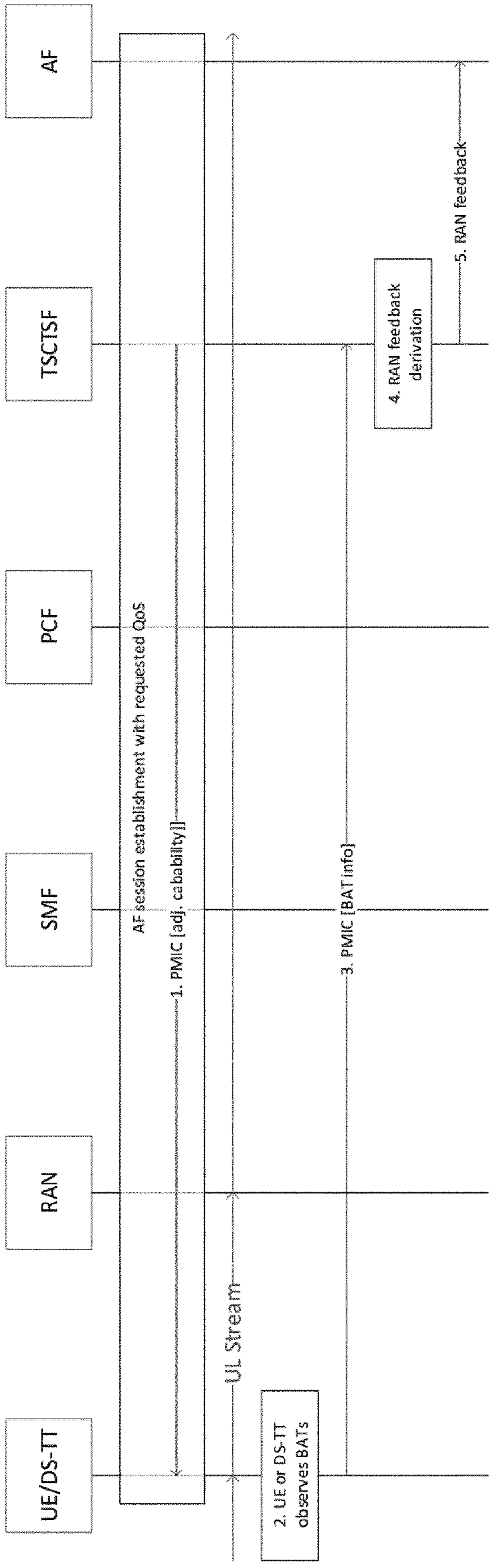
FIG. 6 shows a signalling flow according to an example embodiment.

FIG. 6 shows a signalling flow diagram for the second example embodiment.

Steps 1 to 3 are as described with reference to FIG. 5.

In step 4, the TSCTSF derives feedback information (e.g., preferred UL burst timing information) taking observed burst arrival times and RAN burst arrival time preferences or radio configuration into account. If DS-TT observed UL burst arrival times, the TSCTSF calculates the feedback information taking UE residence time into account.

In step 5, the TSCTSF provides the feedback information to the AF.

When the entity comprises the uplink ingress node, the method comprises observing the burst timing information.

The method may comprise receiving an indication at the entity to observe the burst timing information and determine feedback information based on the observed burst timing information.

The indication may be provided from a TSCTSF using a PMIC or in Non-Access Stratum (NAS) signalling from a SMF. The indication may comprise at least one of an indication of the uplink periodic traffic stream (e.g., a packet filter to identify the UL traffic stream) and a measurement configuration (e.g., the measurement type (absolute BAT, offset), measurement period and reporting interval).

The method may comprise providing the feedback information to the function associated with the application using a PMIC.

In a third example embodiment, the UE observes burst arrival times and periodicity of UL packets and derives UL burst arrival time by comparing observed burst arrival times to the allocated radio resources and/or radio configuration. The UE communicates UL RAN feedback information via DS-TT to the TSCTSF using PMIC and TSCTSF forwards the feedback information to the application function.

Figure 7:
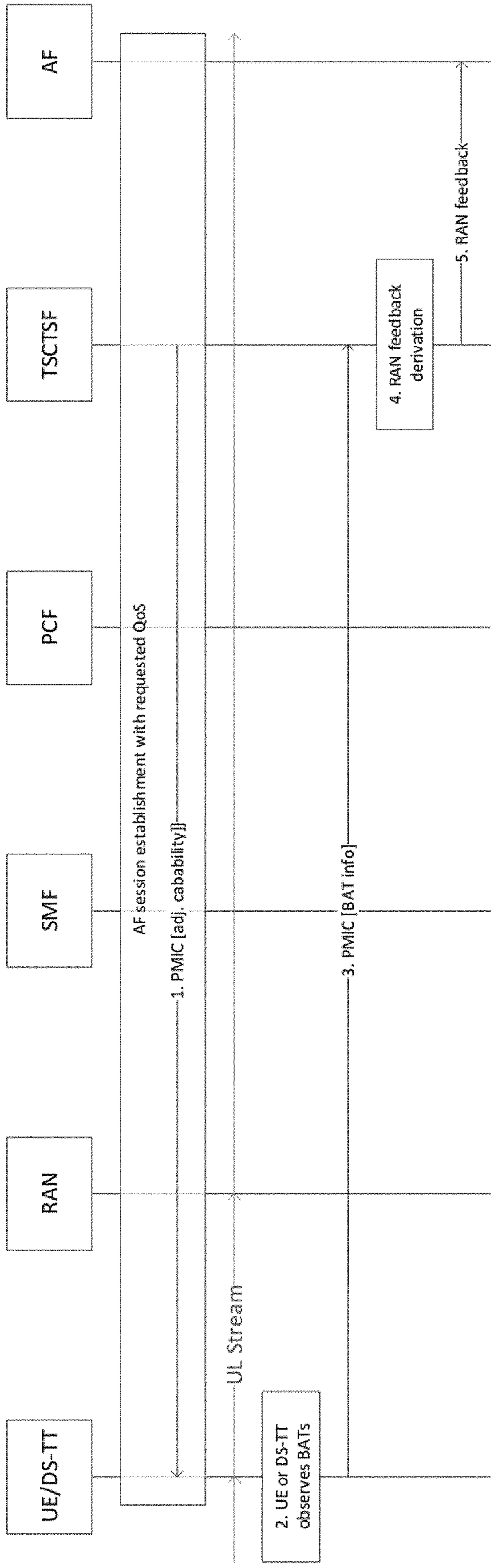
FIG. 7 shows a signalling flow according to an example embodiment

FIG. 7 shows a signalling flow diagram according to the third example embodiment.

In this example, the PMIC from the TSCTSF to DS-TT includes burst timing adjustment capability of the application and an indication to derive the preferred UL burst timing feedback.

In step 2, the UE observes burst arrival times and periodicity of UL packets and derives UL feedback information by comparing observed burst arrival times to the timing of allocated radio resources.

In step 3, the DS-TT includes the UL RAN feedback into Port Management Information Container (PMIC) and sends PMIC to the TSCTSF as specified in 3GPP standards.

In step 4, the TSCTSF provides RAN feedback to the AF.

Alternatively, when the entity comprises the uplink ingress node, the method may comprise providing the feedback information to the function associated with the application via a AMF. The feedback information may be provided to the AMF using Non-Access Stratum (NAS) Session Management (SM) signalling.

In a fourth example embodiment, a UE observes burst arrival times and periodicity of UL packets and derives feedback information (e.g., preferred BAT) by comparing observed burst arrival times to the allocated radio resources and/or radio configuration as described for the third example embodiment. The UE then communicates UL burst timing information in the NAS SM signaling and associates to the corresponding QoS Flow mapped to the traffic filter.

The UE includes the UL feedback into NAS SM signaling and sends it to the AMF which forwards it to TSCTSF via PCF.

The TSCTSF provides the received feedback to the AF.

Figure 8:
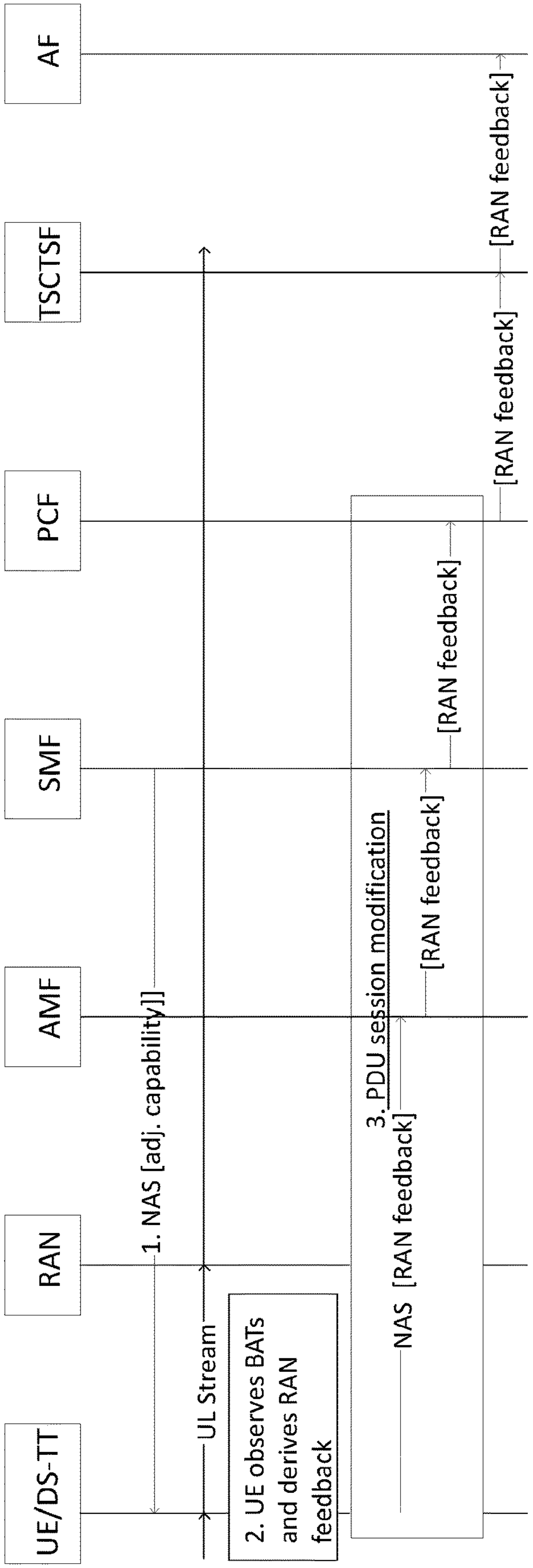
FIG. 8 shows a signalling flow according to an example embodiment.

FIG. 8 shows a signalling flow diagram according to the fourth example embodiment.

In step 1, the UE receives an indication from the SMF to determine burst timing feedback.

In step 2, The UE observes burst arrival times and periodicity of UL packets and derives feedback by comparing observed burst arrival times to the allocated radio resources and/or radio configuration.

In step 3, the UE communicates feedback information in the NAS SM signaling to AMF, which forwards it to the AF via SMF, PCF and TSCTSF.

Method as described with reference to FIGS. 4 to 8 may enable determination of preferred UL burst timing information. This has a greater impact for delay of UL streams than DL streams since typical TDD patterns have more DL- than UL slots.

The method introduces no impact to RAN protocols and minimal impact to 5GC protocols by utilizing containers specified for the time sensitive communication.

An apparatus may comprise means for, at an entity, receiving determining burst timing information for at least one uplink periodic traffic stream of an application at an uplink ingress node, determining feedback information based on the burst timing information and radio access network, RAN, information and providing the feedback information to a function associated with the application.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
(i) a combination of analog and/or digital hardware circuit (s) with software/firmware and
(ii) any portions of hardware processor(s) with software (including digital signal processor(s)), software, and memory (ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor; and at least one memory storing instructions that, when executed by the at least one processor, cause the apparatus at least to perform, at an uplink ingress node:

receiving, from a time sensitive communication time synchronization function or a session management function, an indication to observe burst timing information for at least one uplink periodic traffic stream of an application;

observing burst arrival times and periodicity of uplink packets of the at least one uplink periodic traffic stream;

determining feedback information by comparing the observed burst arrival times to timing of allocated radio resources; and providing the feedback information to a function associated with the application.

2. An apparatus according to claim 1, wherein the indication is received from the time sensitive communication time synchronization function in a port management information container.

3. An apparatus according to claim 2, wherein the indication further comprises a burst timing adjustment capability of the application.

4. An apparatus according to claim 2, wherein the apparatus is further caused to perform providing the feedback information to the function associated with the application via a device side time sensitive network translator to the time sensitive communication time synchronization function using a port management information container.

5. An apparatus according to claim 1, wherein the indication is received from the session management function via non-access stratum signaling.

6. An apparatus according to claim 5, wherein the apparatus is further caused to perform providing the feedback information to the function associated with the application via non-access stratum session management signaling to an access and mobility management function, which forwards the feedback information to the function via a session management function, a policy control function, and a time sensitive communication time synchronization function.

7. An apparatus according to claim 1, wherein the indication comprises at least one of a packet filter to identify the uplink periodic traffic stream and a measurement configuration.

8. An apparatus according to claim 7, wherein the measurement configuration comprises a measurement type, a measurement period, and a reporting interval.

9. An apparatus according to claim 7, wherein the apparatus is further caused to perform comparing the packet filter received in the indication to filters in Quality of Service rules for mapping uplink packets to Quality of Service flows to identify the at least one uplink periodic traffic stream.

10. An apparatus according to claim 1, wherein the at least one uplink periodic traffic stream is a Quality of Service flow.

11. An apparatus according to claim 10, wherein the apparatus is further caused to perform associating the feedback information with a corresponding Quality of Service flow mapped to a traffic filter.

12. An apparatus according to claim 1, wherein the feedback information comprises preferred uplink burst timing information.

13. An apparatus according to claim 1, wherein the uplink ingress node comprises a user equipment or a device side time sensitive network translator.

14. An apparatus according to claim 1, wherein the burst timing information comprises at least one of burst periodicity, absolute burst arrival time, burst arrival time variation, and offset time to a configured scheduling grant.

15. An apparatus according to claim 1, wherein:

the indication is received from a time sensitive communication time synchronization function in a port management information container, the port management information container including a burst timing adjustment capability of the application and an indication to derive preferred uplink burst timing feedback;

the uplink ingress node observes the burst arrival times and periodicity of the uplink packets and derives the feedback information by comparing the observed burst arrival times to the timing of allocated radio resources;

the apparatus is further caused to perform including the feedback information in a port management information container and providing the port management information container to the time sensitive communication time synchronization function; and the time sensitive communication time synchronization function provides the feedback information to the function associated with the application.

16. A method comprising, at an uplink ingress node:

receiving, from a time sensitive communication time synchronization function or a session management function, an indication to observe burst timing information for at least one uplink periodic traffic stream of an application;

observing burst arrival times and periodicity of uplink packets of the at least one uplink periodic traffic stream;

determining feedback information by comparing the observed burst arrival times to timing of allocated radio resources; and providing the feedback information to a function associated with the application.

17. A method according to claim 16, wherein the indication is received from the time sensitive communication time synchronization function in a port management information container.

18. A method according to claim 16, wherein the indication is received from the session management function via non-access stratum signaling.

19. A method according to claim 16, further comprising providing the feedback information to the function associated with the application via a device side time sensitive network translator to a time sensitive communication time synchronization function using a port management information container.

20. A method according to claim 16, further comprising providing the feedback information to the function associated with the application via non-access stratum session management signaling to an access and mobility management function.

* * * * *